(12) United States Patent
Engelhart

(10) Patent No.: US 11,729,587 B1
(45) Date of Patent: Aug. 15, 2023

(54) DYNAMIC RELOCATION OF ACCOUNT INFORMATION BASED ON MOBILITY OF WIRELESS DEVICE

(71) Applicant: T-Mobile USA, Inc., Bellevue, WA (US)

(72) Inventor: Robert Engelhart, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 311 days.

(21) Appl. No.: 17/209,075

(22) Filed: Mar. 22, 2021

(51) Int. Cl.
| | |
|---|---|
| *H04W 4/24* | (2018.01) |
| *H04W 8/06* | (2009.01) |
| *H04W 8/18* | (2009.01) |
| *H04W 60/04* | (2009.01) |
| *H04W 4/02* | (2018.01) |
| *H04W 48/16* | (2009.01) |
| *H04W 64/00* | (2009.01) |
| *H04W 36/32* | (2009.01) |

(52) U.S. Cl.
CPC ............ *H04W 4/24* (2013.01); *H04W 4/025* (2013.01); *H04W 8/06* (2013.01); *H04W 8/18* (2013.01); *H04W 48/16* (2013.01); *H04W 60/04* (2013.01); *H04W 64/003* (2013.01); *H04W 36/32* (2013.01)

(58) Field of Classification Search
None
See application file for complete search history.

(56) References Cited

U.S. PATENT DOCUMENTS

| | | | |
|---|---|---|---|
| 6,628,947 | B1 | 9/2003 | Yu et al. |
| 7,522,907 | B2 | 4/2009 | Lupper et al. |
| 7,583,953 | B2 | 9/2009 | Choi et al. |
| 7,738,488 | B2 | 6/2010 | Marsico et al. |
| 7,864,673 | B2 | 1/2011 | Bonner |
| 7,920,529 | B1 | 4/2011 | Mahler et al. |
| 8,565,722 | B1 | 10/2013 | Cheuk et al. |
| 9,237,023 | B2 | 1/2016 | Nandal |
| 11,438,463 | B1* | 9/2022 | Muralimanohar .... H04W 88/06 |
| 2006/0079228 | A1 | 4/2006 | Marsico et al. |
| 2011/0035336 | A1* | 2/2011 | Cai ................... H04M 15/8044 705/400 |
| 2012/0202550 | A1 | 8/2012 | Marsico et al. |

(Continued)

FOREIGN PATENT DOCUMENTS

| | | |
|---|---|---|
| CN | 102647699 A | 8/2012 |
| CN | 102647700 A | 8/2012 |
| CN | 103444212 A | 12/2013 |

(Continued)

*Primary Examiner* — Jinsong Hu
*Assistant Examiner* — Alexander J Yi
(74) *Attorney, Agent, or Firm* — Perkins Coie LLP

(57) ABSTRACT

A system of a wireless telecommunications network performs a process initiated in response to an indication of a chargeable event (e.g., a registration procedure). The system obtains a current location of the wireless device, determines that the current location is different from a home location, and queries a database of a home charging function (CHF) for charging information of a subscriber associated with the wireless device. The system then dynamically stores the charging information at a database of a local CHF thereby eliminating the need to check with the home CHF when responding to every subsequent chargeable event, which reduces the service latency otherwise experienced by the wireless device.

20 Claims, 4 Drawing Sheets

(56) References Cited

U.S. PATENT DOCUMENTS

2013/0084829 A1    4/2013  De et al.
2016/0182244 A1    6/2016  Shrader et al.

FOREIGN PATENT DOCUMENTS

| | | | | |
|---|---|---|---|---|
| CN | 109792645 A | * | 5/2019 | ............ H04W 36/12 |
| EP | 2671396 A1 | | 12/2013 | |
| EP | 2761905 A2 | | 8/2014 | |
| EP | 2679032 B1 | | 5/2019 | |
| JP | 4904345 B2 | | 3/2012 | |
| JP | 2016123128 A | | 7/2016 | |
| KR | 20020078898 A | | 10/2002 | |
| KR | 20060118881 A | | 11/2006 | |
| WO | 2006031927 A2 | | 3/2006 | |
| WO | 2013049587 A2 | | 4/2013 | |
| WO | 2013155942 A1 | | 10/2013 | |
| WO | 2014195809 A1 | | 12/2014 | |

* cited by examiner

DYNAMIC RELOCATION OF ACCOUNT INFORMATION BASED ON MOBILITY OF WIRELESS DEVICE

BACKGROUND

In telecommunications, 5G is the fifth-generation technology standard for cellular networks, the successor to 4G networks, which provide connectivity to most current mobile phones. Like its predecessors, the service area of 5G networks is divided into geographic areas called cells. The wireless devices in a cell are connected to internet and telephone networks by radio waves through a local antenna of the cell. A main advantage of 5G networks is greater bandwidth, yielding higher communications speeds, eventually up to 10 gigabits per second (Gbit/s). Due to the increased bandwidth, 5G networks can also serve as general Internet service providers (ISPs) and will make possible new applications in internet-of-things (IoT) and machine-to-machine (M2M) technology areas.

Commercial deployment of 5G services is not possible without capabilities that are at least partially specified in 3GPP standards for network operators to monetize services. A charging system enables real-time control of a subscriber's consumption of 5G resources (e.g., for charging purposes) an/or metadata collection per wireless device for generating a charging data record (CDR). The charging system has a service-based interface (SBA) integrated into the overall 5G system, enabling deployments of charging functions (CHFs) in a virtualized environment. The CHF introduced in the 5G system architecture allows charging services to be offered to authorized network functions and/or devices. A converged online and offline charging procedure is also supported in 5G. The charging system can interface with existing billing systems (e.g., for 4G) to allow operators to preserve their billing environment. However, existing charging systems have a rigid architecture that causes latencies to access or use services, which is particularly problematic and noticeable in high-speed networks such as 5G.

BRIEF DESCRIPTION OF THE DRAWINGS

Embodiments of the present technology will be described and explained through the use of the accompanying drawings.

Figure 1:
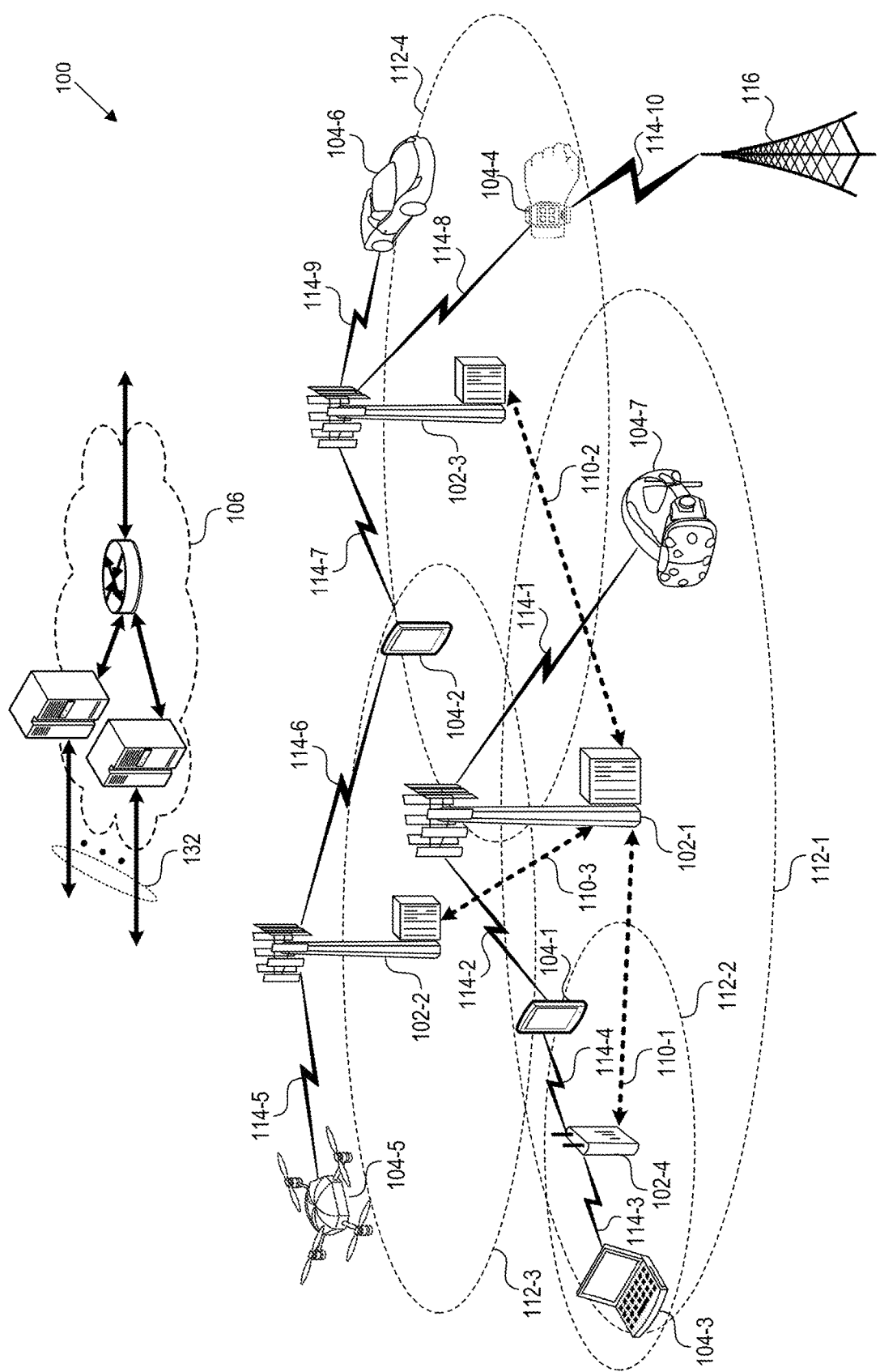
FIG. 1 is a block diagram that illustrates a wireless communications system.

The technologies described herein will become more apparent to those skilled in the art from a study of the Detailed Description in conjunction with the drawings. Embodiments are illustrated by way of example and not limitation in the drawings, in which like references can indicate similar elements. While the drawings depict various embodiments for the purpose of illustration, those skilled in the art will recognize that alternative embodiments can be employed without departing from the principles of the technologies. Accordingly, while specific embodiments are shown in the drawings, the technology is amenable to various modifications.

DETAILED DESCRIPTION

The disclosed technology relates to real-time relocation of account information based on the mobility of a subscriber's wireless device. In one example, charging information is normally stored persistently at one or more datacenters. For ease of understanding, the disclosure illustrates examples based on a subscriber's "home" location; however, a subscriber's account information can be stored at additional fixed locations. The term "home" is used herein for convenience but can refer to a current or fixed location. A fixed location is designated by the network operator. For example, a home location can depend on a subscriber's demographic information including a home address, zip code, or an area code associated with the subscriber's wireless device. Whenever a chargeable event issues for the wireless device, irrespective of location, a wireless telecommunications network ("network") must check with a charging system of the home location to authorize the event, which can result in service latency that is particularly problematic in high-speed networks (e.g., 5G) and where the subscriber is physically distant from the fixed location of the account information. The disclosed technology overcomes these drawbacks by dynamically relocating account information in real-time based on the mobility of wireless devices.

Specifically, a network operator has datacenters located in different geographic regions. A datacenter of a particular geographic region can serve any subscriber with a home location within or near the particular geographic region. The home location is fixed by the operator. The datacenters include servers that support an online charging system (OCS) that includes a charging function (CHF). The CHF allows the network to charge subscribers in real-time based on service usage. However, the account information is stored only at the datacenter associated with the subscriber's home location (and possibly other fixed locations). Hence, the account information resides permanently and exclusively at least at the subscriber's home datacenter for use by the home CHF.

Accordingly, every time a subscriber seeks to establish a data session from a local network, the local network must obtain authorization from a home CHF, irrespective of the location of the subscriber's wireless device. The need for authorization specifically from a fixed CHF introduces a service delay, particularly when the wireless device is physically distant from the fixed CHF. The latency experienced by the wireless device is proportional to the distance of the subscriber's wireless device from the fixed location of the account information.

As described herein, an Access and Mobility Management Function (AMF) of a network is triggered to use a subscriber's home CHF for authorization in response to chargeable events. In an example of a registration procedure, the disclosed technology relocates a subscriber's account information to a datacenter that is closer to a current location of a subscriber's wireless device. Hence, the subscriber's "current" CHF is dynamic because it changes depending on the mobility of the subscriber's wireless device. Thus, the network dynamically selects a nearby CHF to authorize chargeable events, irrespective of a "home" CHF. By retrieving the account information during registration and keeping a local copy, the subscriber can experience data access with less latency, which is significant and noticeable in 5G because of high communications speeds. Thus, dynamically relocating charging information to a local CHF reduces latency compared to using a fixed CHF, which can optimize charging processes in telecommunication networks (e.g., 5G network). Further, the dynamic relocation of charging information to a local CHF can avoid needing to maintain and update multiple copies across CHFs, which would require increased hardware capabilities and associated costs, as well as create race conditions to replicate current data across CHFs.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example" and "embodiment" are used interchangeably. For example, reference to "one example" or "an example" in the disclosure can be, but not necessarily are, references to the same embodiment; and, such references mean at least one of the embodiments. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Examples of instruments, apparatus, methods and related results according to the examples of this disclosure are given herein. Note that titles or subtitles may be used in the examples for convenience of a reader, which in no way limit the scope of the disclosure. Unless otherwise defined, all technical and scientific terms used herein have the same meaning as commonly understood by one of ordinary skill in the art to which this disclosure pertains. In the case of conflict, the present disclosure, including definitions, will control.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities that are capable of communication using various connectivity standards. For example, a 5G communication channel can use millimeter wave (mmW) access frequencies of 28 GHz or more. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some embodiments, the wireless devices 104 are capable of communicating signals via the LTE network and an mmW system (e.g., as part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 can be referred to as an LTE+mmW eNB/gNB or an LTE+mmW TP/BS/mmW-BS.

Figure 2:
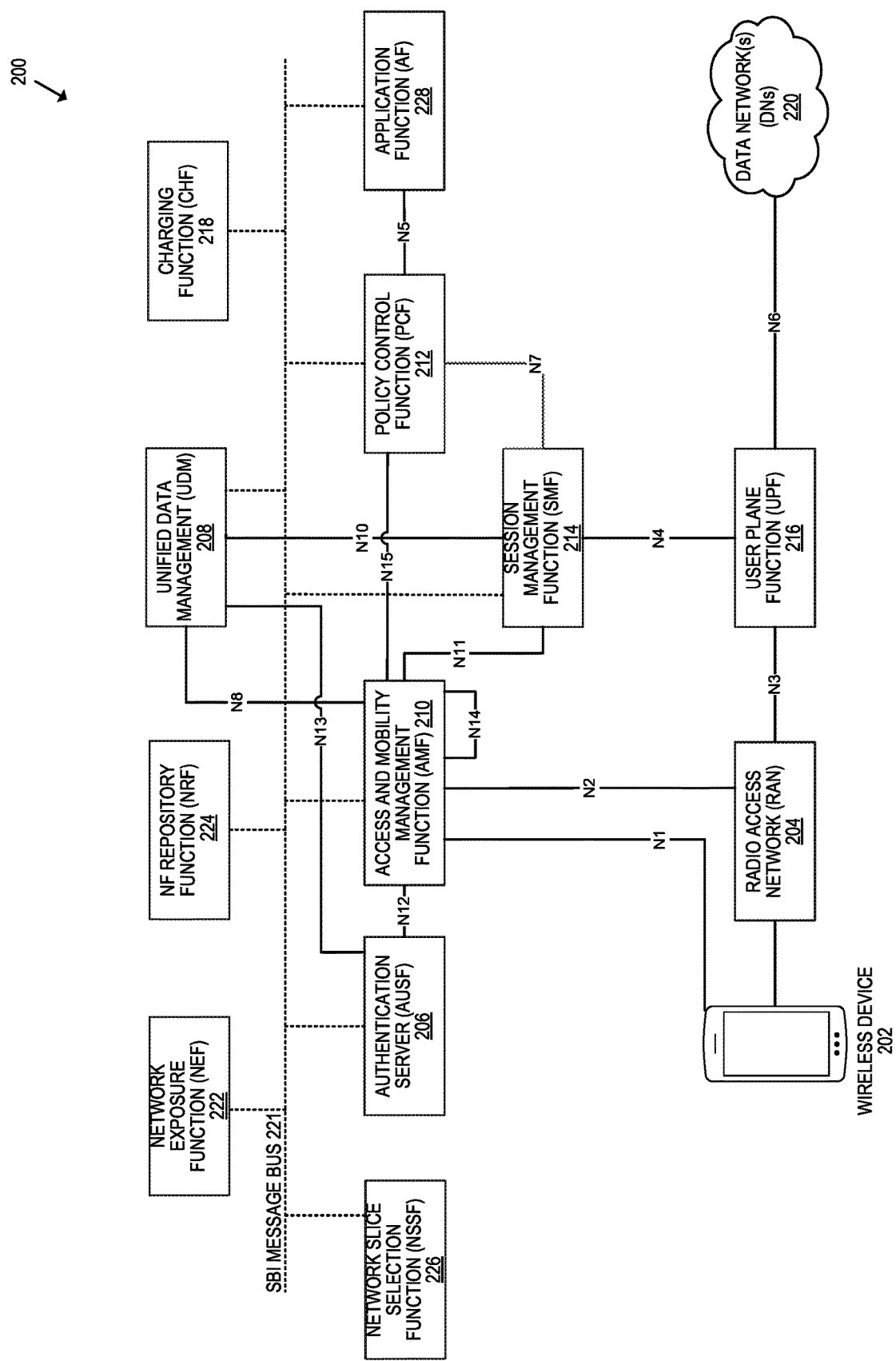
FIG. 2 is a block diagram that illustrates an architecture of network functions of a 5G network that can implement aspects of the present technology.

FIG. 2 is a block diagram that illustrates an architecture 200 including network functions (NFs) of a 5G network that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Dynamic Relocation of Account Data

The 3GPP TS 32.256 standard describes procedures, which are repurposed by the disclosed technology. In one example, the disclosed technology repurposes a registration procedure, so that the AMF triggers relocation of charging information to a local CHF before a subscriber requests authorization to establish a data session. Accordingly, the local CHF can provide the charging information for subsequent data sessions. Thus, the disclosed technology reduces service latency by using the registration procedure to relocate a subscriber's account information during registration, from a first CHF to a second CHF that is geographically closer to the subscriber's current location. As such, the network can subsequently access the account information from the local CHF, which reduces the roundtrip time latency to obtain authorization because the charging information is stored physically closer to the wireless device compared to a home CHF.

A 5G network architecture provides connection and mobility converged charging ("converged charging"), which, when activated, is performed by an AMF to interact with a CHF. The AMF uses an AMF charging profile to determine whether converged charging is activated and, if true, interacts with the CHF to obtain charging information. Specifically, a Charging Data Request and a Charging Data Response are exchanged between the AMF and the CHF. The Request is issued by the AMF towards the CHF when a condition is satisfied, which constitutes a chargeable event. Examples of chargeable events relate to changes in registration, connection, or location of a wireless device. Each chargeable event that is defined for converged charging is specified as a condition with the associated behavior that satisfies the condition. When a charging event is issued towards the CHF, it includes details such as a Subscriber Identifier (e.g., SUPI).

The AMF supports a set of default chargeable events when converged charging is active. The AMF charging profile is used by the AMF to determine whether converged charging is active or not, and which charging event is applicable when active. The CHF can activate/deactivate a chargeable event at the AMF level. The CHF can update the AMF charging profile to activate/deactivate charging functionality. For example, when converged charging is active in the AMF charging profile for registration, the AMF issues a Charging Data Request to the CHF in response to a registration procedure that satisfies a condition of that chargeable event. In another example, when connection charging is active in the AMF charging profile, a Charging Data Request is sent to the CHF in response to a connection event that satisfies the condition of the chargeable event. In other examples, a location reporting charging event or other charging event can trigger the AMF to issue a Charging Data Request to the CHF for real-time charging. If the AMF receives a Charging Data Response that includes an update for the AMF charging profile to deactivate a charging event, the AMF will cancel the charging event.

Figure 3:
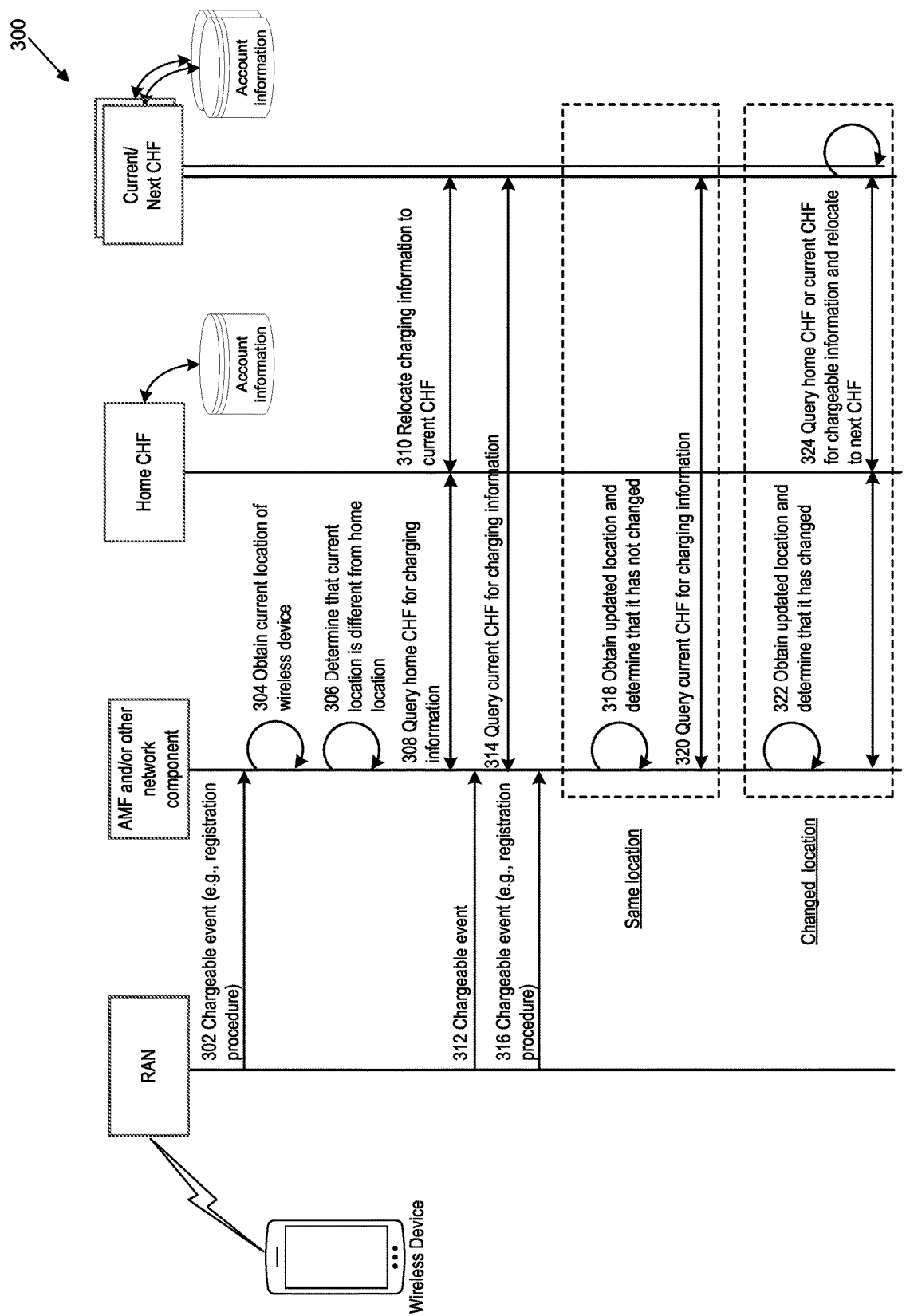
FIG. 3 is a flowchart that illustrates a process for dynamically relocating charging information of a subscriber in response to a registration procedure for a wireless device.

FIG. 3 is a flowchart that illustrates processes 300 for dynamically relocating charging information of a subscriber in response to a registration procedure for a wireless device. The process is performed in real-time by a system of a wireless telecommunications network (e.g., 5G network).

For example, a wireless device connects through a NAN of a RAN to the network. In general, the core network detects a chargeable event and an online charging system (OCS) processes the event to charge the subscriber in real-time for access to services. The subscriber is associated with a current charging function (CHF) that stores the subscriber's charging information. In one example, the current CHF is the most recent location having the most recent account information. In another example, any CHF can track the location or account information such that any CHF can be queried to find the current location of the current account information.

For example, a home CHF can serve a geographic region that includes a home location of the subscriber. A particular CHF is selected from among multiple CHFs and designated as a fixed home CHF for that subscriber. In one example, each CHF is associated with a geographic location and the home CHF is selected as such because the home location of the subscriber is within or near the location of the home CHF. The subscriber's zip code or area code are examples of demographic information of the subscriber that can be used to designate a home location.

At 302, the system receives or detects an indication of a chargeable event associated with a wireless device on the network. Examples of a chargeable event include a registration, changed connection status, changed location, or presence of the wireless device. For example, a registration procedure for the wireless device can trigger an AMF to interact with a CHF to obtain account information for the subscriber of the wireless device. The AMF is triggered to authorize the subscriber to register with the network and report the registration to the home CHF.

At 304, in response to the registration procedure, the system obtains a current location of the wireless device. The system can determine (e.g., calculate, estimate, infer) the current location from which the wireless device is attempting to register with the network. In one example, a registration request is accompanied with location information (e.g., the current CHF can infer the location of the subscriber based on information in the request from the AMF). The location information can include a cell ID, AMF name, or ID for a base station ID that connects the wireless device to the network. As such, the current location of the wireless device is inferred from the known location of the cell, AMF, or base station. In another example, the current location is determined based on signals transmitted by the wireless device. For example, the current location can be calculated based on signal strength measurements or the wireless device can communicate a GPS location to the system.

At 306, the system determines that the current location is different from the subscriber's home location. In one example, the system correlates the current location of the wireless device with the locations of multiple CHFs including the home CHF. The correlation is indicative of the physical distance between the wireless device and any of the CHFs. In another example, each of the CHFs is associated with an identifier for a geographic region and each NAN within the geographic region is likewise associated with the region's identifier. The system can compare the identifier of the NAN that connects the wireless device to the network with identifiers of the CHFs. In this example, the system determines that the identifier of the home CHF does not match the identifier of the NAN connected to the wireless device or matches the identifier of a CHF other than the home CHF. As such, the system determines that the current location is not the subscriber's home location.

At 308, the system queries the database of the home CHF for the subscriber's charging information once the wireless device is registered (or upon commencing registration). In one example, the AMF uses device information to authorize the subscriber, notifies the CHF that the subscriber is registered, and then obtains charging information that enables the wireless device to access a data service and establish a data session after registration is complete. The charging information can include a charging profile of the subscriber and expresses a criterion or a rule for charging the subscriber based on a subscription to a service plan. The criterion or rule can limit a data service (e.g., maximum data usage, balance, prepaid, monthly data allocation).

At 310, the system dynamically selects a CHF from among the network's multiple CHFs to relocate the charging information from the home CHF. In particular, the system selects a local CHF relative to the current location of the wireless device. The local CHF becomes a "current" CHF that maintains a local copy of the charging information for the subscriber. In one example, a CHF with a geographic region that includes the current location of the wireless device is selected as the current CHF. Hence, the current CHF is geographically closer to the current location compared to the home CHF.

The system can migrate (e.g., move) the charging information from the database of the home CHF to a database of the current CHF. In another example, the system copies the charging information stored at the database of the home CHF and stores the copy of the charging information at the database of the current CHF. Hence, the charging information can remain fixed at the database of the home CHF and dynamically copied to other CHFs as needed based on the mobility of the wireless device.

In some implementations, the charging information is only temporarily relocated to the database of a current CHF. For example, the relocated charging information can be associated with a time period and, upon expiration of that time period, the charging information is removed or marked for removal. Moreover, after expiration of the time period, the system would need to confirm that the current location has not changed since the last time that it was used to select the current CHF.

The dynamic relocation of the charging information to a local CHF, in response to the registration of the wireless device, reduces the latency that otherwise occurs when the wireless device subsequently seeks to access a user service or establish a session on the network. For example, at 312, the system receives an indication of a chargeable event. The chargeable event can include a request to establish a data session over the network. Given that the charging information was relocated to the current CHF beforehand, at 312 the system handles a request by querying the current CHF for the charging information at 314 rather than querying the home CHF to authorize the data session. For example, the AMF can interact with an SMF to query an account-finder database that points to the current CHF rather than the home CHF. The SMF can thus establish a data session based on the charging information retrieved from the current CHF.

The system can continue to dynamically relocate the account information based on the continued mobility of the wireless device. For example, at 316, the system detects another registration procedure to re-register the wireless device on the network. The system responds differently to the registration procedure depending on whether the current location of the wireless device changed to another location. For example, at 318 the system obtains an updated location of the wireless device and determines that the current location of the wireless device has not changed. In response, at 320 the system continues to use the database of the current CHF rather than querying the home CHF.

Alternatively, at 322, the system obtains an updated location of the wireless device and determines that the current location has changed to a next location (e.g., a new location). For example, the system determines that a subsequent indication of a registration procedure was received for the wireless device from the new location that is different from the home location and the current location.

At 324, the system retrieves the charging information from the database of the home CHF or the current CHF and relocates the charging information to a database of the next CHF that is closer to the new location compared to the home CHF and the current CHF. The system would then subsequently query the database of the next CHF for the charging information rather than querying the remotely located home CHF.

While specific examples are illustrated herein for ease of understanding, various implementations are possible within the scope of the disclosed technology. For example, the concept of a "location" to move the account information (e.g., a CHF) is not necessarily constrained. In other words, the CHF or some generalized charging function such as an app or a centralized traditional application like the 3GPP specified CHF can be located anywhere in the network and in various forms. Those forms can be a monolithic application, a distributed application, one or more microservices, a container-based cluster, or any other form that provides charging functionality, which can be deployed anywhere that the functionality is supported. Examples include being collocated with the wireless device, the AMF, a customer location, an "edge" location, town, city, state, region, etc.

Computer System

Figure 4:
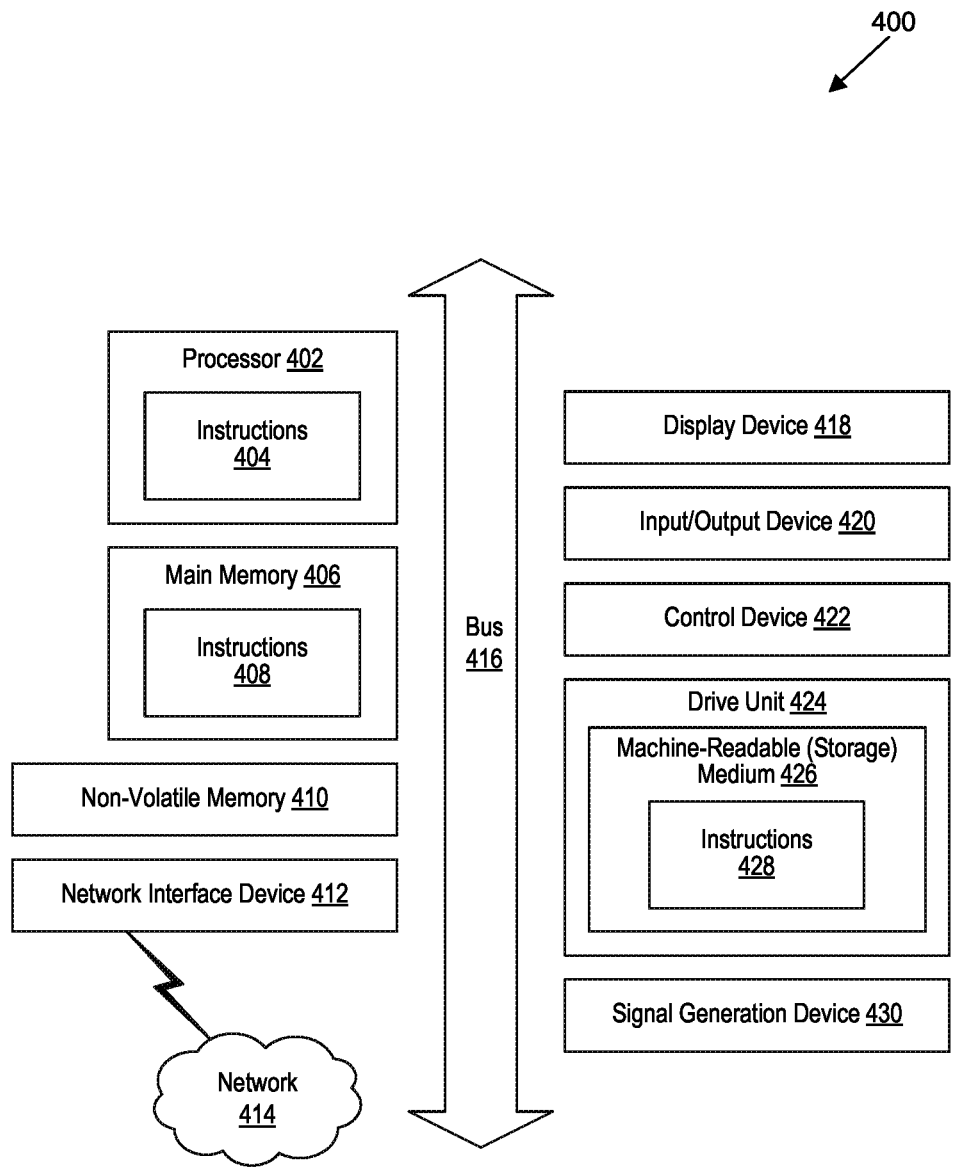
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include one or more processors 402, main memory 406, non-volatile memory 410, a network interface device 412, video display device 418, an input/output device 420, a control device 422 (e.g., keyboard and point device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. The bus 416 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an IEEE standard 1394 bus (also referred to as "Firewire"). Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some embodiment, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The processor 402 can be, for example, a central processing unit, a conventional microprocessor (e.g., Intel Pentium processor). The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. One of skill in the relevant art will recognize that the machine-readable medium 426 can include any type of medium that is accessible by the processor. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Although embodiments have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

Software is typically stored in the non-volatile memory and/or the drive unit 424. When software is moved to the memory for execution, the processor 402 will typically make use of hardware registers to store values associated with the software, and local cache that can serve to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 412 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

Examples of the I/O devices 420 include a keyboard, a mouse or other pointing device, disk drives, printers, a scanner, and other input and/or output devices, including a display device. Examples of the display device 418 can include a cathode ray tube (CRT), liquid crystal display (LCD), or any display device.

In operation, the computer system 400 can be controlled by operating system software that includes a file management system, such as a disk operating system. One example of operating system software with associated item management system software is the family of operating systems known as Windows® from Microsoft Corporation of Redmond, Wash., and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The technologies introduced here can be implemented by programmable circuitry (e.g., one or more microprocessors), software and/or firmware, special-purpose hardwired (e.g., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the disclosure can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems can be used with programs in accordance with the described teachings, or it can prove convenient to construct more specialized apparatus to perform the methods of some embodiments. The required structure for a variety of these systems will appear from the description. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed embodiments can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. At least one non-transitory computer-readable storage medium carrying instructions, which, when executed by at least one processor, cause a wireless telecommunications network to:
   trigger, by an Access and Mobility Management Function (AMF), a registration procedure to register a wireless mobile device on the wireless telecommunications network;
   in response to the trigger:
      obtain a current location from which the wireless mobile device is attempting to register with the wireless telecommunications network based on an identifier of the AMF that initiates the registration procedure, or an indication of a cell ID or a base station through which the wireless mobile device is connected;
      determine that the current location is different from a home location for a subscriber of the wireless mobile device,
         wherein the home location is associated with a database of a home charging function (CHF) that stores charging information of the subscriber, and
         wherein the charging information indicates a criterion or rule for enabling the wireless mobile device to access a data service of the wireless telecommunications network; and
      dynamically relocate the charging information from the database of the home CHF to a database of a current CHF geographically closer to the current location compared to the home CHF;
   receive a request to establish a data session over the wireless telecommunications network;
   in response to the request to establish the data session, query the current CHF for the charging information to authorize the data session,
      wherein the charging information includes a charging profile of the subscriber and an indication of a subscription to a data service plan;
   receive an indication of a chargeable event for the wireless mobile device at a next location different from the home location and the current location,
      wherein the chargeable event is selected from a group including:
         a registration procedure,
         a changed connection status,
         a change in a location of the wireless mobile device, or
         a change in a presence of the wireless mobile device; and
      in response to the indication of a chargeable event, relocate the charging information to a database of a next CHF that is closer to the next location compared to the current CHF and the home CHF.

2. The at least one non-transitory computer-readable storage medium of claim 1, wherein the wireless telecommunications network is further caused to:
   detect a subsequent registration procedure to register the wireless mobile device on the wireless telecommunications network;
   determine that the current location of the wireless mobile device has not changed; and
   in response to the subsequent registration procedure from the current location, maintain the charging information at the database of the current CHF.

3. The at least one non-transitory computer-readable storage medium of claim 1, wherein the wireless telecommunications network is further caused to:
   detect a subsequent registration procedure to register the wireless mobile device from a next location different from the home location and the current location; and
   dynamically relocate the charging information from the database of the home CHF to a database of a next CHF that is closer to the next location compared to the home CHF and the current CHF.

4. The at least one non-transitory computer-readable storage medium of claim 1, wherein the wireless telecommunications network is further caused to:
   detect a subsequent registration process to register the wireless mobile device from a next location different from the home location and the current location;
   dynamically relocate the charging information from the database of the current CHF to a database of a next CHF that is closer to the next location compared to the home CHF and the current CHF.

5. The at least one non-transitory computer-readable storage medium of claim 1, wherein the wireless telecommunications network is further caused to:
   receive an indication of a chargeable event for the wireless mobile device,
      wherein the indication of the chargeable event includes an indication of the subscriber;
   in response to the indication of a chargeable event, trigger an interaction with the home CHF; and
   copy the charging information to a database of a next CHF that is geographically closer to a location of the wireless mobile device compared to the current CHF and the home CHF.

6. The at least one non-transitory computer-readable storage medium of claim 1, wherein the wireless telecommunications network is at least in part a 5G network.

7. The at least one non-transitory computer-readable storage medium of claim 1,
   wherein the current location of the wireless mobile device is inferred from the cell ID or a location of the base station.

8. The at least one non-transitory computer-readable storage medium of claim 1, wherein to determine that the current location is different from the home location comprises causing the wireless telecommunications network to:
   correlate the current location of the wireless mobile device with the locations of multiple CHFs including the home CHF,
      wherein the correlation is indicative of a physical distance between the wireless mobile device and any of the multiple CHFs.

9. The at least one non-transitory computer-readable storage medium of claim 1, wherein the wireless telecommunications network is caused to, prior to the registration procedure:
   select one or more fixed CHFs including the home CHF from among multiple CHFs to store the charging information,
      wherein the one or more fixed CHFs are selected based on demographic information of the subscriber associated with the wireless mobile device.

10. The at least one non-transitory computer-readable storage medium of claim 1, wherein to relocate the charging information to the database of the current CHF comprises causing the wireless telecommunications network to:
    migrate the charging information from the database of the home CHF to the database of the current CHF.

11. The at least one non-transitory computer-readable storage medium of claim 1, wherein to relocate the charging information to the database of the current CHF comprises causing the wireless telecommunications network to:
    copy the charging information stored at the database of the home CHF; and
    store the copy of the charging information at the database of the current CHF,
       wherein the charging information is persistently maintained at the database of the home CHF.

12. A system of a wireless telecommunications network, the system comprising:
    at least one hardware processor; and
    at least one non-transitory memory storing instructions, which, when executed by the at least one hardware processor, cause the system to:
       trigger, by an Access and Mobility Management Function (AMF), a registration procedure to register a wireless mobile device on the wireless telecommunications network;
       in response to the trigger:
          obtain a current location from which the wireless mobile device is attempting to register with the wireless telecommunications network based on an identifier of the AMF that initiates the registration procedure, or an indication of a cell ID or a base station through which the wireless mobile device is connected;
          determine that the current location is different from a home location for a subscriber of the wireless mobile device,
             wherein the home location is associated with a database of a home charging function (CHF) that stores charging information of the subscriber, and
             wherein the charging information indicates a criterion or rule for enabling the wireless mobile device to access a data service of the wireless telecommunications network; and
          dynamically relocate the charging information from the database of the home CHF to a database of a current CHF geographically closer to the current location compared to the home CHF;
       receive a request to establish a data session over the wireless telecommunications network;
       in response to the request to establish the data session, query the current CHF for the charging information to authorize the data session,
          wherein the charging information includes a charging profile of the subscriber and an indication of a subscription to a data service plan;
       receive an indication of a chargeable event for the wireless mobile device at a next location different from the home location and the current location,
          wherein the chargeable event is selected from a group including:
             a registration procedure,
             a changed connection status,
             a change in a location of the wireless mobile device, or
             a change in a presence of the wireless mobile device; and
       in response to the indication of a chargeable event, relocate the charging information to a database of a next CHF that is closer to the next location compared to the current CHF and the home CHF.

13. The system of claim 12 further caused to:
    detect a subsequent registration procedure to register the wireless mobile device on the wireless telecommunications network;
    determine that the current location of the wireless mobile device has not changed; and
    in response to the subsequent registration procedure from the current location, maintain the charging information at the database of the current CHF.

14. The system of claim 12 further caused to:
  detect a subsequent registration procedure to register the wireless mobile device from a next location different from the home location and the current location; and
  dynamically relocate the charging information from the database of the home CHF to a database of a next CHF that is closer to the next location compared to the home CHF and the current CHF.

15. The system of claim 12 further caused to:
  detect a subsequent registration process to register the wireless mobile device from a next location different from the home location and the current location;
  dynamically relocate the charging information from the database of the current CHF to a database of a next CHF that is closer to the next location compared to the home CHF and the current CHF.

16. A method performed by a wireless telecommunications network, the method comprising:
  triggering, by an Access and Mobility Management Function (AMF), a registration procedure to register a wireless mobile device on the wireless telecommunications network;
  in response to the trigger:
    obtaining a current location from which the wireless mobile device is attempting to register with the wireless telecommunications network based on an identifier of the AMF that initiates the registration procedure, or an indication of a cell ID or a base station through which the wireless mobile device is connected;
    determining that the current location is different from a home location for a subscriber of the wireless mobile device,
      wherein the home location is associated with a database of a home charging function (CHF) that stores charging information of the subscriber, and
      wherein the charging information indicates a criterion or rule for enabling the wireless mobile device to access a data service of the wireless telecommunications network; and
    dynamically relocating the charging information from the database of the home CHF to a database of a current CHF geographically closer to the current location compared to the home CHF;
  receiving a request to establish a data session over the wireless telecommunications network;
  in response to the request to establish the data session, querying the current CHF for the charging information to authorize the data session,
    wherein the charging information includes a charging profile of the subscriber and an indication of a subscription to a data service plan;
  receiving an indication of a chargeable event for the wireless mobile device at a next location different from the home location and the current location,
    wherein the chargeable event is selected from a group including:
      a registration procedure,
      a changed connection status,
      a change in a location of the wireless mobile device, or
      a change in a presence of the wireless mobile device; and
  in response to the indication of a chargeable event, relocating the charging information to a database of a next CHF that is closer to the next location compared to the current CHF and the home CHF.

17. The method of claim 16, wherein determining that the current location is different from the home location comprises:
  correlating the current location of the wireless mobile device with the locations of multiple CHFs including the home CHF,
    wherein the correlation is indicative of a physical distance between the wireless mobile device and any of the multiple CHFs.

18. The method of claim 16, wherein relocating the charging information to the database of the current CHF comprises:
  migrating the charging information from the database of the home CHF to the database of the current CHF.

19. The method of claim 16, wherein relocating the charging information to the database of the current CHF comprises:
  copying the charging information stored at the database of the home CHF; and
  storing the copy of the charging information at the database of the current CHF, wherein the charging information is persistently maintained at the database of the home CHF.

20. The method of claim 16, wherein the current location of the wireless mobile device is inferred from the cell ID or a location of the base station.

* * * * *